2,801,205

PROCESS OF PRODUCING DEXTRAN

Earl R. Kooi, La Grange, Ill., assignor to Corn Products Refining Company, New York, N. Y., a corporation of New Jersey No Drawing. Application April 7, 1954, Serial No. 421,694

20 Claims. (Cl. 195—32)

This invention relates to an improved process for producing dextran. More particularly it relates to a process for the enzymatic conversion to dextran of the dextrins in partially hydrolyzed amylaceous materials with enzymes derived from an organism of the genus Acetobacter, e.g., *Acetobacter capsulatum* and *Acetobacter viscosum*.

When *Acetobacter capsulatum* or *Acetobacter viscosum* is grown on a substrate containing as one of the constituents a carbohydrate, polyhydric alcohol, or a similar source of organic carbon-containing material, three enzyme systems are produced, (1) dextran-dextrinase, which converts dextrins to dextran, (2) an amylase, which hydrolyzes glucose polymers to glucose, and (3) a "glucose oxidase" or "glucose dehydrogenase" which converts glucose to gluconic acid. Thus, when it is desired to prepare dextran by a process involving (1) fermentation of a carbohydrate material, for example, for the accumulation of dextran-dextrinase followed by (2) an enzyme conversion of a partially hydrolyzed amylaceous material for the accumulation of dextran, both of the other enzyme systems are operative during this second period. The result is that considerable quantities of gluconic acid accumulate during the enzyme conversion period, and unless this acid is continuously neutralized, the pH value of the enzyme conversion liquor falls below the optimum value for the accumulation of dextran.

The main object of this invention is to prevent the formation of gluconic acid in such process. This is accomplished by the addition to the enzyme digest of a material which specifically inhibits the "glucose oxidase" or "glucose dehydrogenase," but causes no inhibition of the dextran-dextrinase.

In carrying out the invention an organism such as *Acetobacter capsulatum* or *Acetobacter viscosum* is grown for an initial period on a substrate conducive to the formation of dextran-dextrinase. To the culture liquor, adjusted to the pH optimum for dextran-dextrinase activity, there is then added a partially hydrolyzed amylaceous material, such as a starch hydrolyzate, having a D. E. value of about 5 to about 65 and a material, such as toluene, which specifically inhibits the formation of gluconic acid by enzymes from the above organism. The mixture is then incubated under conditions conducive to dextran formation. The substrate aforementioned may be a polyhydric alcohol or a partially hydrolyzed amylaceous material or the like, and although the substrate on which the organism is grown is not to be considered a part of this invention, it should be appreciated that the three enzyme systems named above are produced by these two organisms whether the carbon source of the substrate is a partially hydrolyzed amylaceous material or a polyhydric alcohol or other suitable material.

The process of my invention will now be described in further detail with particular reference to partially hydrolyzed starch as both the substrate for the formation of dextran-dextrinase and, also, as the raw material for the formation of dextran. Starch is hydrolyzed as with acid in conventional manner until the D. E. value (dextrose equivalent, i.e., percent of reducing sugars, on dry basis, calculated as dextrose) is within the range of about 5 to about 65. The pH of the resultant starch hydrolyzate is adjusted to 4.5 to 5.5, and then the hydrolyzate is skimmed or filtered. Thereafter, the solids content is adjusted to about 5 percent and there is added to the concentrated liquor about 0.5 gram per 100 ml. of an organic nitrogenous material, such as dehydrated yeast extract, corn steep liquor, or the like. The pH of the liquor is then adjusted to 5.5 to 6.8 and the liquor is sterilized in known manner, e. g., at about 120° C. for 20 minutes. Next the resultant fermentation medium is cooled to about 25° to 30° C. and thereafter it is inoculated with a suitable culture grown 10 to 48 hours on the same medium as heretofore described in amount within the range of about 2 to about 20 percent by volume of fermentation medium. The medium is agitated and aerated until dextran-dextrinase activity reaches a substantially maximum value, for example about 10 to 16 hours. There is then added to the culture liquor a material which inhibits the enzymatic formation of gluconic acid but does not inhibit the dextran-dextrinase. There may also be added an additional quantity of starch hydrolyzate. The liquor is then incubated under conditions conducive to the formation of dextran by the dextran-dextrinase, as for example at pH 4.5 and 30 to 35° C.

I have previously discovered that the rate of dextran formation from starch hydrolyzates can be markedly increased by agitation and aeration of the culture liquor. Further that the rate of dextran production and the concentration at which the substrate can be efficiently converted to dextran can be effectively increased by starting the fermentation of a carbohydrate concentration of not more than 10 grams per 100 ml. and adding a concentrated solution of the carbohydrate material after active fermentation has begun. An additional means of insuring rapid dextran formation at high carbohydrate concentrations is to maintain the pH of the culture liquor at about 5.5 to 6.8 for the first 10 to 24 hours and thereafter at about 3.5 to 5.0 until the fermentation is completed. These discoveries are described in my co-pending application, Serial No. 328,154, filed December 26, 1952.

If an inhibitor for the enzymes producing gluconic acid is not added, the pH of the liquor drops to a value which is not optimum for the action of the dextran-dextrinase. For example, comparative rates of dextran formation by the dextran-dextrinase enzyme at different pH values are as follows:

| pH: | Rate of dextran formation in hours |
|---|---|
| 3.0 | 65 |
| 3.2 | 70 |
| 3.4 | 83 |
| 3.6 | 90 |
| 3.8 | 96 |
| 4.0 | 97 |
| 4.2 | 98 |
| 4.4 | 100 |
| 4.6 | 93 |
| 4.8 | 88 |
| 5.0 | 81 |
| 6.0 | 20 |
| 7.0 | 0 |

Although the pH during the enzymatic formation of dextran may be maintained at the optimum value by continuous neutralization of the gluconic acid, in either case in the absence of the inhibitor considerable quantities of gluconic acid accumulate. By means of the present invention, it is possible to maintain stable, optimum pH during the course of the enzymatic formation of dextran without recourse to additional neutralization. Further, the invention is also advantageous in that the prevention of the formation of gluconic acid results in easy recovery of both dextran and the residual, non-dextran carbohydrate since only two materials need be separated. There is no loss of carbohydrate due to formation of gluconic acid.

The invention is particularly applicable to enzymatic conversion of partially hydrolyzed materials, e. g. any starch, to dextran, wherein the enzymes are obtained from cultures of Acetobacter and wherein the enzyme mixture contains, in addition to the dextran-dextrinase enzyme, an enzyme system which converts glucose to gluconic acid.

The following examples will further illustrate the invention but it should be understood that they are typical and informative and not in any way limiting the invention.

Example 1

*Acetobacter capsulatum* was grown for 17 hours on a medium composed of a 17 D. E. acid hydrolyzate of corn starch together with yeast extract, as above described. The culture liquor was then adjusted to a pH 4.5 and divided into two portions. To each was added sufficient of a 17 D. E. acid hydrolyzate of corn starch having a pH of 4.5 to bring the total concentration to 13 grams of dry substance per 100 ml. To one portion was added one percent toluene, by volume. Both portions were agitated constantly at 30° C. Following are the results obtained:

|  | No Toluene Added | Toluene Added |
|---|---|---|
| pH at: |  |  |
| 0 hours | 4.5 | 4.5 |
| 4 hours | 3.9 | 4.5 |
| 21 hours | 3.4 | 4.5 |
| 65 hours | 3.1 | 4.5 |
| Comparative rate of dextran formation (in hours) | 79 | 100 |
| Decrease in reducing sugars, weight percent of acid hydrolyzate dry substance | 12 | 0 |
| Increase in acidity, (as gluconic) weight percent of acid hydrolyzate dry substance | 11 | 0 |

It is readily seen from the above example that toluene completely inhibits the formation of gluconic acid and thus results in the maintenance of a constant pH value throughout the enzymatic formation of dextran. Further, the addition of toluene even in amounts as great as 5 percent by volume has no detrimental effect on the formation of dextran, although there is no advantage in using more than about one percent, by volume.

Example 2

Other materials which behave similarly to toluene when used under the conditions described in Example 1, i. e., inhibit the formation of gluconic acid without inhibiting dextran-dextrinase activity are:

| Material | Lowest Effective Concentration, Grams per 100 ml. |
|---|---|
| Benzene | 0.50. |
| Xylene | about 1.0. |
| Thymol | about 0.1. |
| Monobutyl-meta-cresol | about 0.025. |

Amounts of inhibitors greater than listed above may be used, but there is no particular advantage in the use of more than the values given above insofar as prevention of gluconic acid formation is concerned.

Example 3

The following example shows that toluene (one percent by volume) is effective in the prevention of gluconic acid formation in the enzymatic formation of dextran from various starch hydrolyzates by enzymes derived from *Acetobacter capsulatum*. The initial pH of each of the substrates was 4.4 to 4.5. The time of the enzyme conversion in each case was 100 hours.

| D. E. of Hydrolyzate | Method of Hydrolysis of Starch | Percent Yield of Dextran |
|---|---|---|
| 5 | acid | 28 |
| 10 | do | 24 |
| 15 | malt enzyme | 20 |
| 17 | acid | 35 |
| 25 | malt enzyme | 15 |
| 30 | acid to 17 D. E. plus malt | 15 |
| 30 | acid | 20 |
| 42 | do | 13 |
| 50 | do | 10 |
| 55 | acid to 17 D. E. plus fungal enzyme | 3 |
| 60 | acid | 6 |
| 62 | acid to 17 D. E. plus fungal enzyme | 3 |

No gluconic acid was produced in any of the above samples in 100 hours of incubation as determined by decrease in pH, the pH remaining the same.

I claim:

1. A process for producing dextran which comprises converting the dextrin, in a partially hydrolyzed amylaceous material, to dextran, by means of dextran-dextrinase derived from Acetobacter, in contact with an inhibitor for glucose dehydrogenase from the group consisting of benzene, alkyl benzene and hydroxy alkyl benzene.

2. Process of claim 1 wherein said hydrolyzed amylaceous material comprises starch hydrolyzed to a D. E. value within the range of about 5 to about 65.

3. Process according to claim 2 wherein said inhibitor is toluene in amount of at least about 0.25 gram per 100 ml. of substrate.

4. Process according to claim 2 wherein said inhibitor is benzene in amount of at least about 0.50 gram per 100 ml. of substrate.

5. Process according to claim 2 wherein said inhibitor is xylene in amount of at least about 1.0 gram per 100 ml. of substrate.

6. Process according to claim 2 wherein said inhibitor is thymol in amount of at least about 0.1 gram per 100 ml. of substrate.

7. Process according to claim 2 wherein said inhibitor is monobutyl-meta-cresol in amount of at least about 0.025 gram per 100 ml. of substrate.

8. Process according to claim 2 wherein said dextran-dextrinase is derived from *Acetobacter capsulatum*.

9. Process according to claim 2 wherein said dextran-dextrinase is derived from *Acetobacter viscosum*.

10. A process for producing dextran which comprises fermenting a medium comprising a source of nitrogen and a partially hydrolyzed amylaceous material with an organism from Acetobacteriaceae until dextran-dextrinase activity reaches substantially the maximum, thereafter adding an organic compound which is an inhibitor for glucose dehydrogenase from the group consisting of benzene, alkyl benzene and hydroxy alkyl benzene, and allowing said dextran-dextrinase to convert the substrate to dextran.

11. Process according to claim 10 wherein said hydrolyzed amylaceous material comprises starch hydrolyzed to a D. E. value within the range of about 5 to about 65.

12. Process according to claim 10 wherein the pH is maintained within the range of 5.5 to 6.8 during the fermentation and within the range of 3.5 to 5.0 during the enzyme conversion.

13. Process according to claim 11 wherein said inhibitor is toluene in amount of at least about 0.25 gram per 100 ml. of substrate.

14. Process according to claim 11 wherein said inhibitor is benzene in amount of at least about 0.50 gram per 100 ml. of substrate.

15. Process according to claim 11 wherein said inhibitor is xylene in amount of at least about 1.0 gram per 100 ml. of substrate.

16. Process according to claim 11 wherein said inhibitor is thymol in amount of at least about 0.1 gram per 100 ml. of substrate.

17. Process according to claim 11 wherein said inhibitor is monobutyl-meta-cresol in amount of at least about 0.025 gram per 100 ml. of substrate.

18. Process according to claim 11 wherein the dextran-dextrinase is derived from *Acetobacter capsulatum*.

19. Process according to claim 11 wherein the dextran-dextrinase is derived from *Acetobacter viscosum*.

20. Process according to claim 11 wherein the medium is agitated and aerated during the formation of the dextran-dextrinase References Cited in the file of this patent

UNITED STATES PATENTS 2,689,816  Kooi _____ Sept. 21, 1954

OTHER REFERENCES

Hehre et al.: Proc. Soc. Exp. Biol. Med., 71, 1949, pages 336–339.

Waksman et al.: Enzymes, 1926, Williams & Wilkins, page 57.